(12) United States Patent
Fan et al.

(10) Patent No.: US 7,329,871 B2
(45) Date of Patent: Feb. 12, 2008

(54) PLASMONIC ENHANCED INFRARED DETECTOR ELEMENT

(75) Inventors: Wenjun Fan, Albuquerque, NM (US); Shuang Zhang, Charleston, IL (US); Kevin J. Malloy, Albuquerque, NM (US); Steven R. J. Brueck, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 11/346,229

(22) Filed: Feb. 3, 2006

(65) Prior Publication Data

US 2006/0175551 A1 Aug. 10, 2006

Related U.S. Application Data

(60) Provisional application No. 60/649,572, filed on Feb. 4, 2005.

(51) Int. Cl.
*G01J 5/02* (2006.01)
(52) U.S. Cl. .................................... 250/353
(58) Field of Classification Search ............ 250/353
See application file for complete search history.

(56) References Cited

U.S. PATENT DOCUMENTS 4,994,664 A * 2/1991 Veldkamp ............... 250/216
6,100,525 A * 8/2000 Eden ..................... 250/338.1
2005/0161589 A1 * 7/2005 Kim et al. ............... 250/216

OTHER PUBLICATIONS

Guang Yang, Dongyi Guan, Weitan Wang, Weidong Wu, Zhenghao Chen, "The inherent nonlinearities of thin silver films," Optical Materials 25 (2004) pp. 439-443.*
J. R. Krenn, H. Ditlbacher, G. Schider, A. Hohenau, A. Leitner, & F. R. Aussenegg, "Surface plasmon micro- and nano-optics," Journal of Microscopy, vol. 209, Pt. 3 (Mar. 3, 2003) pp. 167-172.*
Grossman et al., Lithographic Spiral Antennas at Short Wavelengths, Appl. Phys. Lett., vol. 59, No. 25, Dec. 16, 1991, pp. 3225-3227.
Fumeaux et al., Lithographic Antennas at Visible Frequencies, Optics Letters, vol. 24, No. 22, Nov. 15, 1999, pp. 1629-1631.

* cited by examiner

*Primary Examiner*—Constantine Hannaher
(74) *Attorney, Agent, or Firm*—MH2 Technology Law Group, LLP

(57) ABSTRACT

Electromagnetic radiation detector elements and methods for detecting electromagnetic radiation, in particular, infrared radiation, are provided. The electromagnetic radiation detector element can include an electromagnetic radiation detector and a plasmonic antenna disposed over the electromagnetic radiation detector. The plasmonic antenna can include a metal film, a sub-wavelength aperture in the metal film, and a plurality of circular corrugations centered around the sub-wavelength aperture.

24 Claims, 9 Drawing Sheets

PLASMONIC ENHANCED INFRARED DETECTOR ELEMENT

CROSS REFERENCE TO RELATED APPLICATIONS

This application claims priority from U.S. Provisional Patent Application Ser. No. 60/649,572, filed Feb. 4, 2005, which is incorporated by reference herein in its entirety.

FIELD OF THE INVENTION

The present invention generally relates to antennas and, more particularly, to antennas for electromagnetic radiation detectors.

BACKGROUND OF THE INVENTION

The infrared spectral region is important for a number of reasons. The peak of the room temperature blackbody radiation spectrum is at about 10 µm. Thus, everything necessarily exchanges energy with the radiation field at infrared wavelengths and there is information on temperature, emissivity, etc. contained in the radiation field. At night, this radiation can be used to visualize the environment and to find particularly "hot" objects—such as, for example, people and engines. Because this makes the spectral region important for defense applications, the military has had a long standing focus on improved infrared technology. The atmosphere is somewhat transparent in two different infrared spectral windows (MWIR: mid-wave infrared 3-5 µm, and LWIR: long-wave infrared 8- to 12 µm), so these regions are of particular interest. Additionally, most molecular vibrations are in the infrared, the vibrational mode of the hydrogen molecule at 2.5 µm is the highest energy fundamental (as opposed to overtone) molecular vibration frequency. The very important C-H stretch vibration (important because all organic compounds have a signature in this wavelength region) is at around 3.3 µm, while heavier and more complex molecules have signatures at longer wavelengths. For example the P-O stretch, that is a signature of many nerve agents, is at around 10 µm. Thus, for many applications there is a need to monitor radiation across the infrared.

Both photon and thermal detectors are widely used to detect and image infrared radiation. Photon detectors absorb a photon and result in the creation of an electron-hole pair that is then collected (in a photovoltaic detector) or the change in resistance due to the increased carrier concentration is monitored (in a photoconductive detector). For thermal detectors the change in some property (for example, resistance, piezoelectric effect, etc.) with temperature is monitored. The sensitivity of all of these detectors is ultimately limited by several sources of noise. Cooled detectors (operating at very low temperatures, as low as liquid He ~4.2° K.) can be made background limited, e.g. the signal to noise is limited by the background radiation that is present in the environment. Most infrared detectors—especially as the detector temperature is increased towards room temperature—are limited by various effects such as thermal generation of electrons and holes and junction leakage that generally scale with the area of the device. Thus, if the electromagnetic fields can be concentrated into a smaller area, such as by using an antenna structure, the detector's performance can be improved. The noise scales as the square root of the current and hence the area, so the figure of merit is the transmission T divided by the square root of the detector area $A_d$ normalized to the antenna area $A_a$ the figure of merit being $T/\sqrt{A_d/A_a}$.

Despite the vast amount of work on antennas at RF and microwave frequencies, relatively little has been done on antennas for infrared frequencies. This is largely because the scale of the photon wavelength (~several micrometers) is quite challenging and until relatively recently, available fabrication has not been up to the manufacturing challenge.

Thus, there is a need to overcome these and other problems of the prior art to provide antennas for electromagnetic detectors, in particular, infrared detectors, and methods for their manufacture.

SUMMARY OF THE INVENTION

In accordance with exemplary embodiments, an infrared detector element is provided. The infrared detector element can include an infrared detector and a plasmonic antenna disposed over the infrared detector. The plasmonic antenna can include a metal film, a sub-wavelength aperture in the metal film, and a plurality of circular corrugations centered around the sub-wavelength aperture.

In accordance with other exemplary embodiments, a method of detecting electromagnetic radiation is provided. The method can include providing a plasmonic antenna on a detector and propagating surface plasma waves along a metal film portion of the plasmonic antenna. An energy from incident electromagnetic radiation can be coupled to the surface plasma waves using a plurality of corrugations on the metal film. The energy can then be transmitted through a sub-wavelength aperture in the metal film to the detector.

In accordance with exemplary embodiments, an electromagnetic radiation detector element is provided. The electromagnetic radiation detector element can include an electromagnetic radiation detector and a plasmonic antenna disposed over the electromagnetic radiation detector. The plasmonic antenna can include a metal film, a sub-wavelength aperture in the metal film, and a plurality of circular corrugations centered around the sub-wavelength aperture.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

FIGS. 7A-7M depict an exemplary method for forming a plasmonic antenna in accordance with the present teachings.

DESCRIPTION OF THE EMBODIMENTS

Figure 1A:
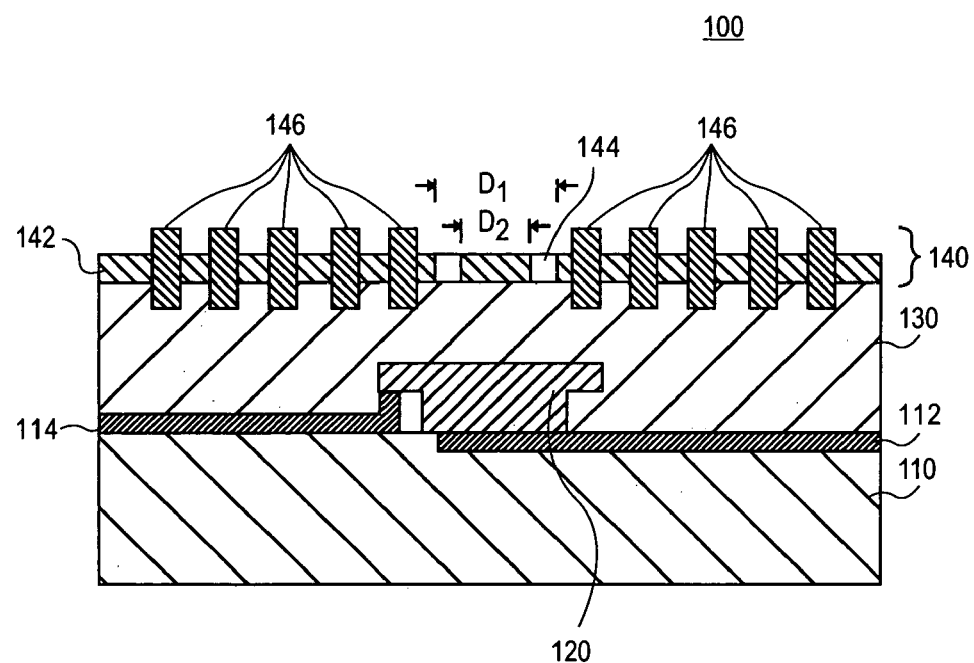
FIG. 1A depicts a cross sectional view of an exemplary infrared detector element including a plasmonic antenna in accordance with the present teachings.

Reference will now be made in detail to exemplary embodiments of the invention, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

FIGS. 1A-9 depict exemplary embodiments of electromagnetic radiation detectors that can include one or more plasmonic antennas. The disclosed plasmonic antennas can enhance detection of wavelengths from the visible to microwave. For ease of illustration, the present teachings will be described with reference to detection of infrared radiation (IR). One of ordinary skill in the art, however, will understand that the present teachings can be applied to detection of other electromagnetic radiation wavelengths including, for example, from about 400 nm to about 10 cm.

While many materials and phenomena are being investigated for mid-wave infrared (MWIR) detectors, the performance of these materials has improved very slowly. Part of this is because the figures of merit such as the normalized detectivity D* and the zero bias resistance-area product ($R_OA$) can be related to fundamental material properties. For example, $R_OA$ for any photovoltaic detector is given by $R_OA=(kTN_d\tau)/\lfloor(qn_i)^2L\rfloor$, where kT is the thermal energy, q the magnitude of the charge on the electron, $N_d$ the doping, $n_i$ the intrinsic carrier concentration, $\tau$ the minority carrier lifetime and L the minority carrier diffusion length. Once the other parameters are fixed, $R_OA$ is a constant independent of the detector area. Thus if the area can be increased to improve photon collection, A will increase but $R_O$ will decrease leaving the same ratio of dark current to signal and hence the same D*. The disclosed detectors including a plasmonic antenna can eliminate this saturation of performance by increasing the $R_OA$ product. For example the, $R_OA$ product can be increased by increasing the effective area of a photovoltaic detector without increasing the dark current. Keeping the area of the detector small and integrating it with a patterned plasmonic antenna can allow the effective collecting area to be magnified by plasmon effects. This allows collection of the incident photons over a pixel-wide area while retaining the low dark current of a small area detector (ideally as small as or smaller than $0.1\lambda^2$).

FIG. 1A depicts a cross sectional view of an exemplary infrared detector element including a plasmonic antenna according to the present teachings. An infrared detector element 100 can include a plasmonic antenna 140 disposed on a dielectric layer 130. Infrared detector element 100 can further include an infrared detector disposed under dielectric layer 130. The infrared detector can include a detector material 120, a first metal contact 112, a second metal contact 114, and a Si readout circuit 110. As used herein, the term "infrared detector" refers to a device that senses infrared radiation and outputs a signal related to the detected infrared radiation. For ease of illustration, however, the figures depict only portions of infrared detector 120. One of ordinary skill in the art will understand that infrared detector 120 can include other elements not shown in the figures.

Infrared detector material 120 can be a photon detector including, but not limited to, indium antimonide (InSb), mercury cadmium telluride (HgCdTe or MCT), lead sulfide (PbS), lead selenide (PbSe), platinum silicide (PtSi), InGaAs, quantum well infrared photodetector (QWIP), quantum dot infrared photodetctor (QDIP), and strained layer superlattices. According to various embodiments, the infrared detector can be a sub-wavelength detector. As used herein, the term "sub-wavelength detector" refers to a detector having a relevant dimension scale smaller than the wavelength of the infrared radiation. Although the exemplary embodiment is described with reference to a photon detector, one of ordinary skill in the art will understand that thermal detectors including a plasmonic antenna are also contemplated.

First metal contact 112 and second metal contact 114 can be formed of the same or dissimilar metals. Dielectric layer 130 can be disposed over infrared detector material 120. Dielectric layer 130 can be formed of any dielectric material including, for example, low index of refraction dielectric materials and polymers.

Figure 4:
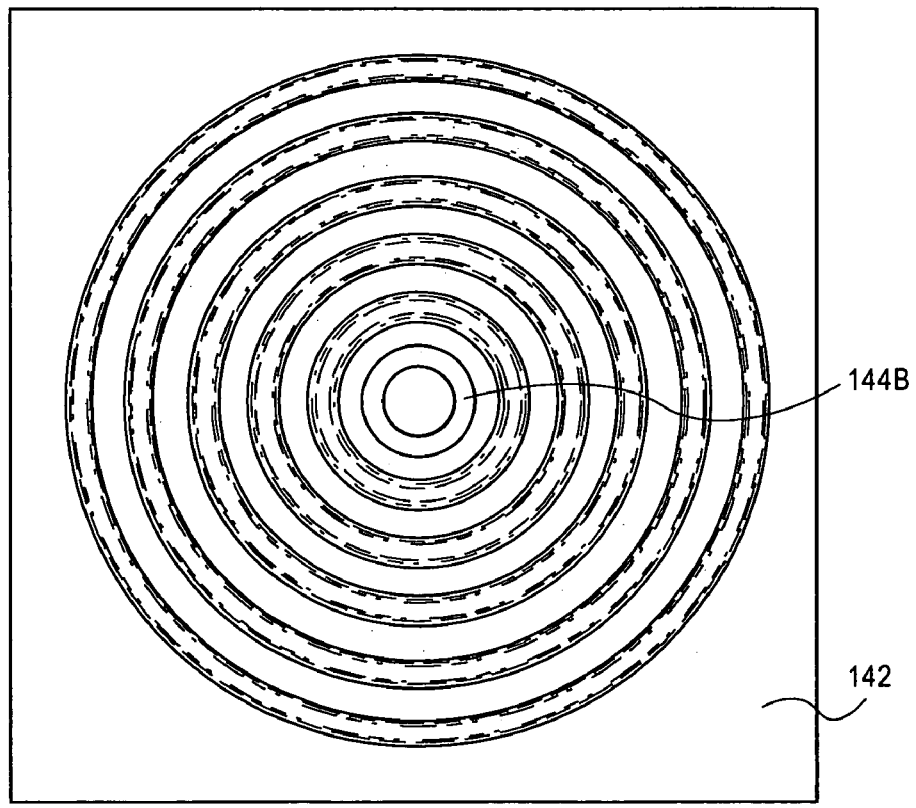
FIG. 4 depicts a top view of an exemplary infrared detector element including plasmonic antenna with a hole aperture in accordance with the present teachings.

Plasmonic antenna 140 can be disposed on dielectric layer 130. According to various embodiments shown in the top view of FIG. 2, plasmonic antenna 140 can be formed of a metal film 142, for example gold, and include a sub-wavelength aperture 144. Sub-wavelength aperture 144 can have a coaxial shape having an inner diameter $D_1$ and an outer diameter $D_2$. According to various other embodiments, the shape of sub-wavelength aperture 144 can vary. It can be a portion of a coaxial structure, for example a portion of coaxial structure 144A shown in FIG. 3, a complex geometric shape, or a hole, for example a hole 144B as shown in FIG. 4. In an exemplary embodiment, the gap of aperture 144 can be filled with air. In other exemplary embodiments, the gap of aperture 144 can be filled with a dielectric material having an index of refraction n, for example, to shift the transmission peak wavelength. According to various embodiments, the width of the sub-wavelength aperture can be much less than the ~$\lambda$/4 width of the corrugations.

Figure 1B:
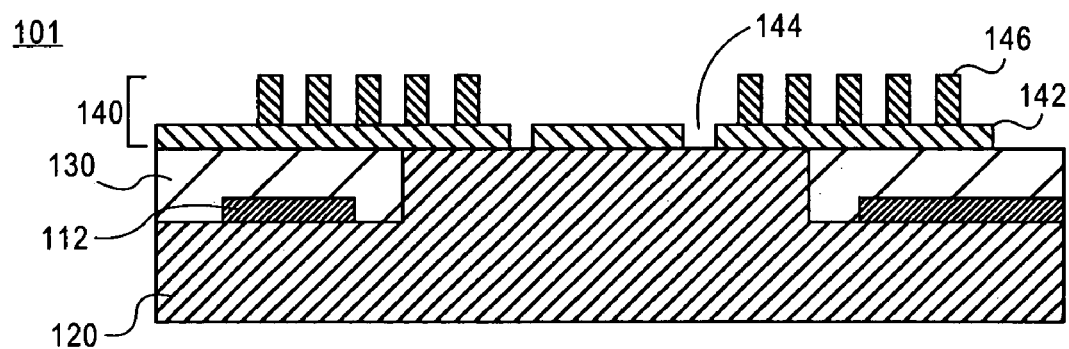
FIG. 1B depicts a cross sectional view of an another exemplary infrared detector element including a plasmonic antenna in accordance with the present teachings.
Figure 1C:
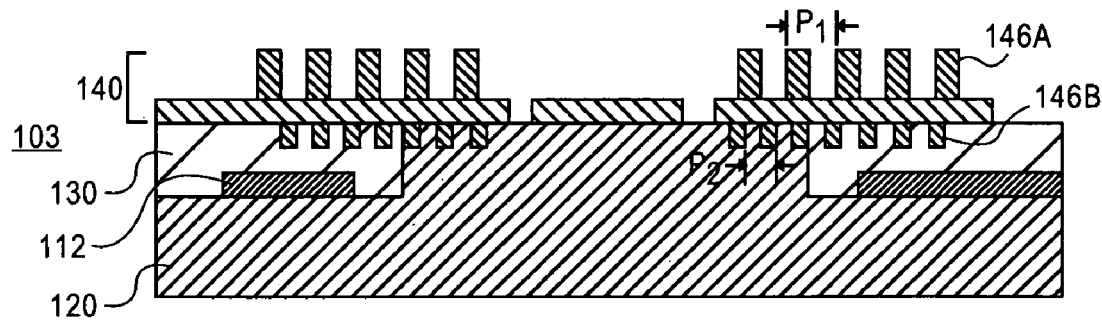
FIG. 1C depicts a cross sectional view of yet another exemplary infrared detector element including a plasmonic antenna in accordance with the present teachings.
Figure 2:
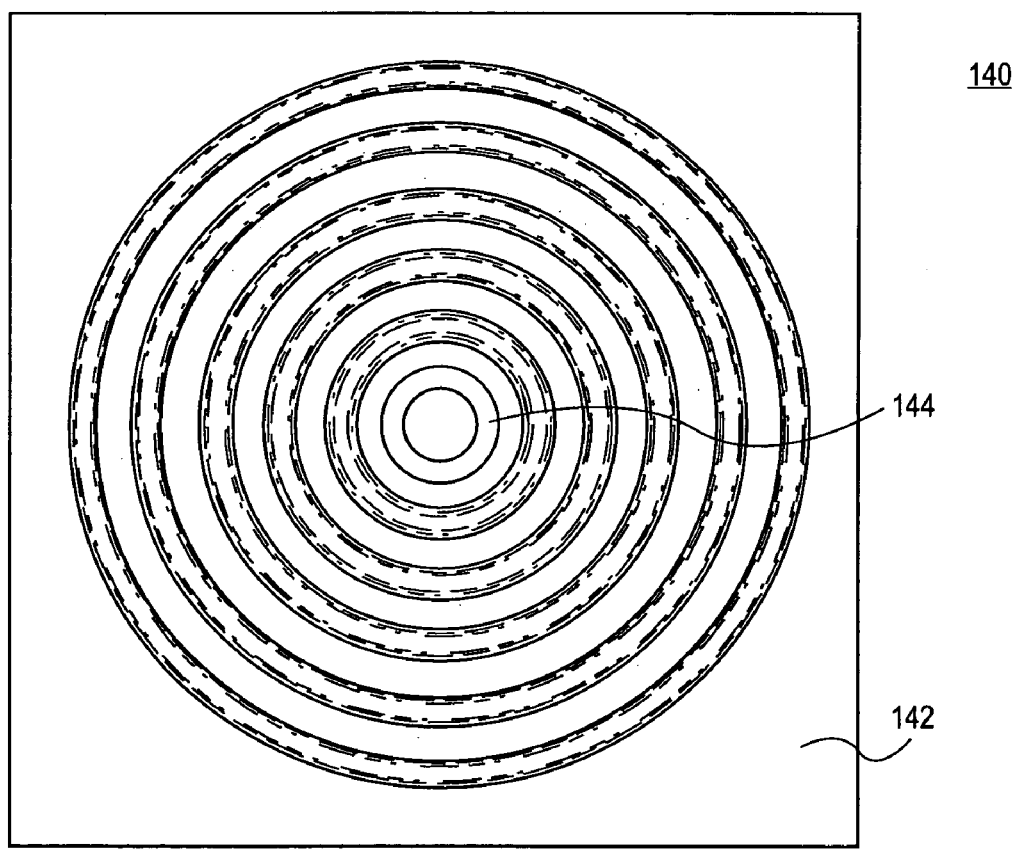
FIG. 2 depicts a top view of an exemplary infrared detector element including a plasmonic antenna in accordance with the present teachings.
Figure 3:
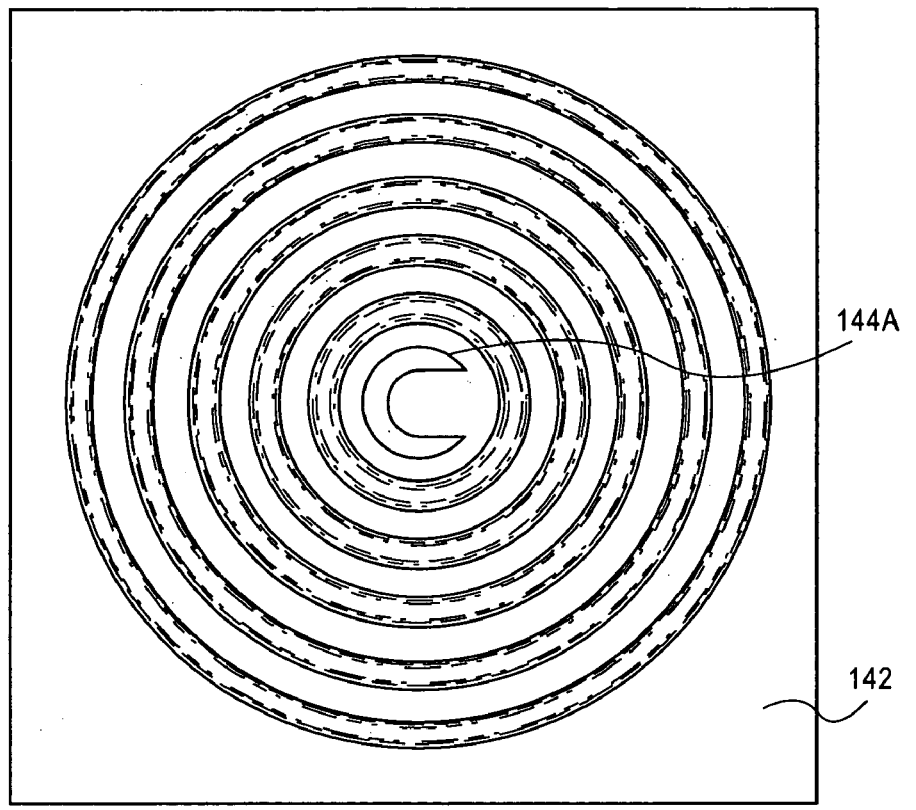
FIG. 3 depicts a top view of an exemplary infrared detector element including plasmonic antenna with a portion of a coaxial aperture in accordance with the present teachings.

Referring to FIGS. 1A-1C and 2, plasmonic antenna 140 can further include a plurality of corrugations 146. Corrugations 146 can be circular and centered around sub-wavelength aperture 144, as shown in FIG. 2. In various embodiments, corrugations 146 can be formed of the same material as metal film 142. According to various embodiments, plasmonic antenna 140 can further include portions of circular corrugations as shown, for example, in FIG. 5A.

In various embodiments, the corrugations can be disposed only on a top portion of the plasmonic antenna. Referring to FIG. 1B, an exemplary infrared detector element 101 can include a plasmonic antenna 140 over a dielectric layer 130, and an infrared detector. The infrared detector can include a detector material 120, and a metal contact 112. One of ordinary skill in the art will understand that the infrared detector can include other components that are not shown for ease of illustration. Plasmonic antenna 140 can include a metal film 142, a sub-wavelength aperture 144, and a plurality of corrugations 146 disposed on a top portion of metal film 142.

In still other embodiments, the corrugations can have a first pitch P1 on a top portion of the plasmonic antenna and a second pitch P2 on a bottom portion of the plasmonic antenna. FIG. 1C shown an exemplary infrared detector element 103 can include a plasmonic antenna 140 over a dielectric layer 130, and an infrared detector. The infrared detector can include a detector material 120, and a metal contact 112. One of ordinary skill in the art will understand that the infrared detector can include other components that are not shown for ease of illustration. Plasmonic antenna 140 can include a metal film 142, a sub-wavelength aperture 144, a plurality of corrugations 146a having a pitch P1 disposed on a top of metal film 142, and a plurality of corrugations 146b having a pitch P2 disposed on a bottom of metal film 142, where P1≠P2.

In operation, the corrugations can couple energy from incident IR radiation to surface plasma waves propagating along the surface of metal film 142. The period of the corrugations can be chosen to couple the incident IR radiation to the surface-plasma wave, for normally incident radiation onto an air—(or vacuum) metal interface the appropriate scale is approximately ½ the infrared wavelength. The energy can then be transmitted through aperture 144 to detector material 120. As discussed above, the use of plasmonic antennas is independent of specific detector technology. If the energy of incident electromagnetic radiation is concentrated into a smaller area using the disclosed plasmonic antenna structures, the noise can be decreased improving the signal to noise of the detector and at the same time, the detector speed can be improved as a result of the lowered capacitance and/or higher mechanical resonance frequencies, etc.

Figure 5A:
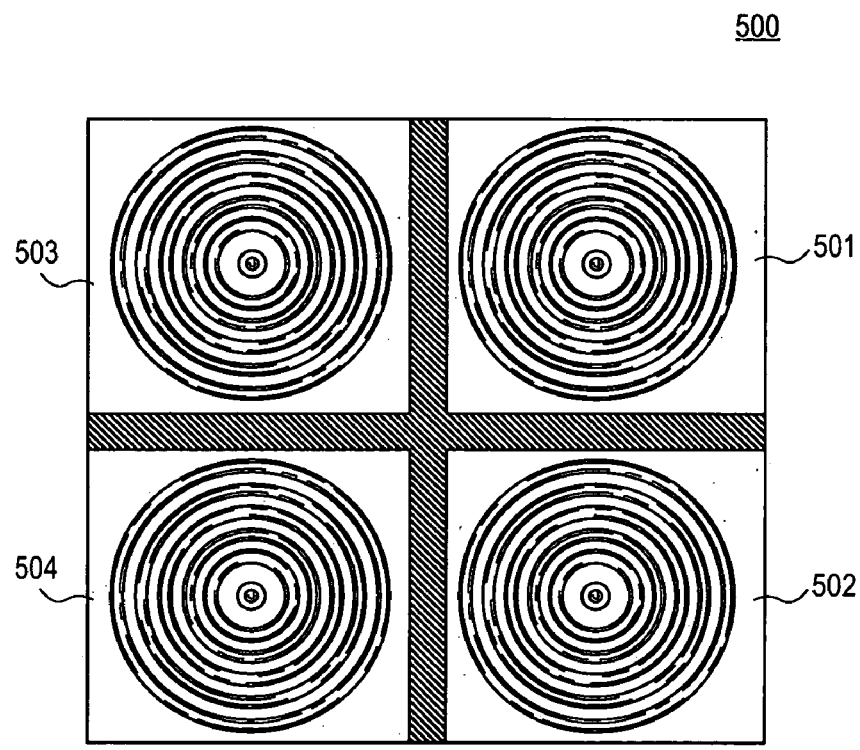
FIG. 5A depicts a top view of a portion of an exemplary infrared detector array in accordance with the present teachings.
Figure 5B:
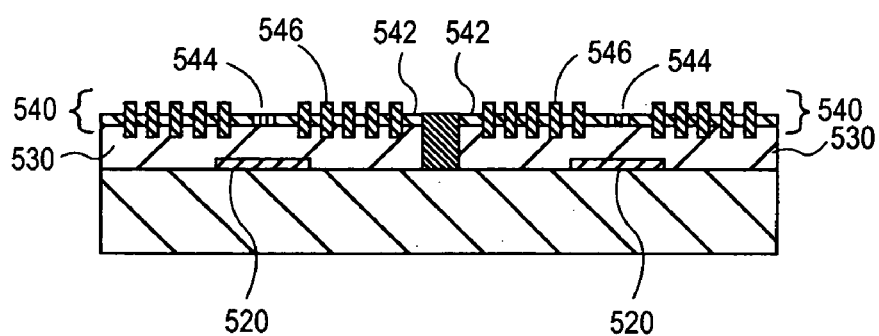
FIG. 5B depicts a cross sectional view of an exemplary infrared detector array in accordance with the present teachings.

According to various embodiments, an infrared detector array can include a plurality of infrared detector elements, each infrared detector element including a plasmonic antenna. FIG. 5A shows a top view of a portion of an infrared detector array 500 including a plurality of pixels 501, 502, 503, and 504. FIG. 5B shows a cross sectional view of infrared detector array 500. Each pixel includes a detector material 520, a dielectric layer 530, and a plasmonic antenna 540. Each plasmonic antenna can include a metal film 542, a plurality of corrugations 546, and a sub-wavelength aperture 544.

According to various embodiments, the area of each pixel 501, 502, 503, and 504 of array 500 can be significantly larger than the area of each detector material 520. Because the noise scales as the square root of the current and, hence the area, the figure of merit is the transmission T divided by the square root of the area $T/\sqrt{A_p/A_a}$ where $A_p$ is the area of the pixel. By using the plasmonic antenna structure to concentrate the electromagnetic fields into multiple smaller areas, one for each pixel, the detector array's performance can be improved.

Incorporating a plasmonic antenna on an electromagnetic detector as disclosed herein can provide enhanced transmission through the sub-wavelength aperture of the plasmonic antenna. While not intending to be bound by any theory, it is believed that the enhanced transmission is due to coupling between the propagating surface plasma wave resonance of the metallic film portion of the antenna and the appropriate guided mode, for example, the localized $TE_{11}$ resonances associated with coaxial apertures. For Johnson-noise-limited detection, the signal scales as the transmission while the noise scales as (aperture area)$^{1/2}$ providing an improvement in the signal-to-noise ratio. This translates directly to improved IR detector array performance in terms of sensitivity and/or higher operating temperature.

To enhance transmission, adjustment can be made to both the period of the corrugations around each subwavelength aperture, to couple to the incident radiation into the surface plasma waves of the metal film/substrate interface, and the dimensions and shape of the aperture, to assure a resonant transfer between the surface plasma wave and the appropriate guided mode. According to various embodiments, this enhanced transmission can be achieved when these resonances are matched. In another embodiment, an array of subwavelength apertures can be used without the additional corrugations; in this case the period of the array provides the coupling into the surface plasma waves. For example, Table 1 summarizes examples of Au plasmonic antenna arrays constructed in this fashion, an array of coaxial apertures spaced by approximately ½ the infrared wavelength, fabricated on a GaAs substrate with different aperture shapes and dimensions.

TABLE 1

|  | a-Inner Radius (nm) | b-Outer Radius (nm) | Coax Gap (nm) | a + b (nm) | Peak (μm) | Opening Area (%) | Transmission (%) | T(%)/A (%) |
|---|---|---|---|---|---|---|---|---|
| Hole |  | 255 |  |  | 3.93 | 16 | 7.5 | 0.46 |
| Coax-1 | 224 | 286 | 62 | 510 | 3.97 | 8 | 14.1 | 1.77 |
| Coax-2 | 230 | 308 | 78 | 538 | 4.03 | 11 | 21.5 | 2.04 |
| Coax-3 | 202 | 347 | 146 | 549 | 4.00 | 20 | 30.4 | 1.52 |
| Coax-4 | 248 | 350 | 102 | 598 | 4.15 | 15 | 36.1 | 2.36 |
| Coax-5 | 277 | 363 | 86 | 640 | 4.26 | 14 | 29.8 | 2.16 |

The transmission spectra for each of the aperture arrays was recorded with a Nicolet Fourier-transform infrared (FTIR) spectrometer using a XT-KBr beam splitter (spectrum range 11000-375 cm$^{-1}$) and a DTGS-KBr detector (spectrum range 12500-350 cm$^{-1}$). All the measurement were performed at normal incidence with an unpolarized, incoherent white light source, which is equivalent to a linearly polarized light normal incidence at the given symmetric of the sample. All the spectra measured were normalized to the transmission of an air background. For clarity, each plasmonic antenna sample spectrum was offset by 2% from one another. The transmission spectrum of a bare double-polished GaAs sample was also measured. At the wavelength range where the transmission peaks reside, the transmission spectra were normalized to remove the effects of Fresnel reflectivity.

Figure 6:
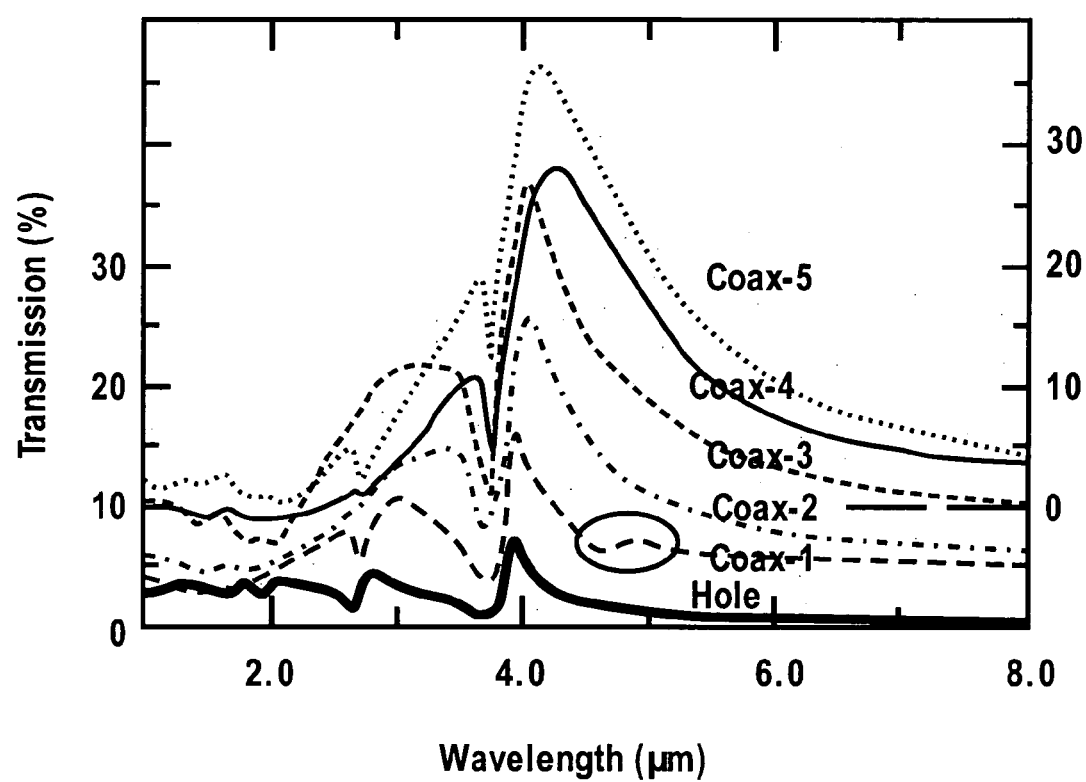
FIG. 6 is a graph showing transmission and peak wavelength for a number of aperture shapes and dimensions.

As shown in FIG. 6, all five of the aperture arrays including the coaxial aperture showed an increase in peak transmission and a shift of the peak to longer wavelengths compared to the array with the hole apertures. For sample Coax-5, a 36% transmission was observed at 4.15 μm. The fractional open area within each unit cell of the array was about 15%; an open annulus of width 102 nm, an inner radius of 248 nm, and outer radius 350 nm on a 1.12 μm period square array. With a slightly smaller fractional open area percentage, the Coax-5 sample showed roughly a 5 times increase in transmission than the array sample including the hole apertures.

Turning now to exemplary methods for making the aperture and, in particular, an array of apertures for a plasmonic antenna. For ease of illustration, an exemplary method is described with reference to an array of apertures formed in an Au layer on a GaAs substrate by interferometric lithography (IL). One of ordinary skill in the art will understand that other materials can be used and other lithographic techniques, such as, for example, electron- and ion-beam lithography can also be used to form the apertures.

Referring to FIG. 7A, a GaAs substrate 710 can be covered with a blanket sacrificial layer 715 of about 400-nm thick of $SiN_x$ by, for example, plasma-enhanced chemical-vapor deposition (PECVD). Next, a layer of PMMA (not shown) of about 20-nm thick can be formed on $SiN_x$ 715, to serve as a sacrificial lift-off dissolution layer in a later processing step. A bottom anti-reflecting coating (BARC) layer 725, for i-line lithography can then be formed on the PMMA layer to minimize reflection of the IL beams from the underlying film stack. Finally, a positive-tone photoresist 735 (e.g., Shipley SPR505A) of about 500-nm thick can be formed on BARC layer 725. As shown in FIG. 7B, IL using a wavelength of 355 nm, $3^{rd}$ harmonic of a YAG:$Nd^{3+}$ laser, can be used to produce a periodic pattern 736, for example, of 1.12-μm pitch, in photoresist layer 735. The period of the pattern can be determined by the angle between the two interferometric beams, while the exposure flux, post-exposure bake and development parameters can control the final pattern line widths. A second IL exposure can be applied after a 90° rotation of the sample.

Referring to FIG. 7C, a layer of Cr of about 60-nm thick can be deposited on the developed photoresist layer 735. After lift-off, the remaining Cr can form a metal etch-mask 745 on top of BARC layer 725. Using metal etch-mask 745, the pattern can be transferred without any change in transverse dimensions through the subsequent etching steps. In FIG. 7D, an $O_2$ plasma reactive-ion etch can be used to anisotropically etch through BARC layer 725 and PMMA layer (not shown) to form patterned BARC layer 725. A subsequent anisotropic etching through $SiN_x$ layer 715 to form patterned $SiN_x$ layer 716 can be performed to generate the locations for the central Au dots of the coaxial array on the substrate surface.

Figure 7M:
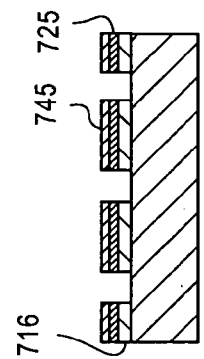
Figure 7M:
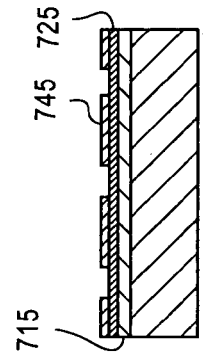
Figure 7M:
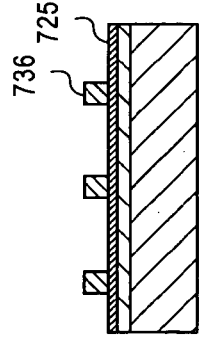
Figure 7M:
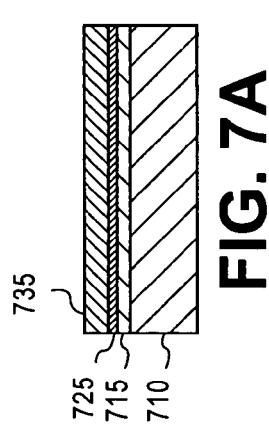
Figure 7M:
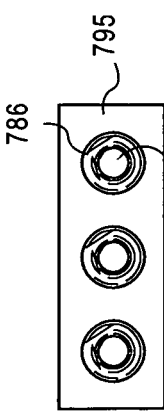

As shown in FIG. 7E, an isotropic etch of patterned $SiN_x$ layer 716 can then be performed to generate an undercut 717 that defines the circular gaps of the coaxial structures. In FIG. 7F, a thin Ti layer (not shown) of about 5 nm can be deposited to improve the metal adhesion to the GaAs substrate 710, and a thicker Au layer 755 of about 50 nm can be deposited to form the central coaxial regions. After deposition, a lift-off step using the sacrificial PMMA layer can remove the Au everywhere except in the coaxial centers, as shown in FIG. 7G. Next, as shown in FIG. 7I, deposition and etch-back steps can be used to re-planarize the surface. A thick layer of photoresist 775 (e.g. AZ-5214) of about 1.9-μm thick can be formed over the Au layer 755 and the patterned $SiN_x$ layer 716, and etched back to expose patterned $SiN_x$ layer 716. For example, an $O_2$-plasma recipe similar to the one used for etching BARC layer 725 can be used to etch-back photoresist 775 and expose patterned $SiN_x$ layer 716. Referring to FIG. 7J, the patterned $SiN_x$ layer 716 can be removed by selective wet etching with buffered oxide etch (BOE) 6:1, leaving a PR filler 776 surrounding the center Au dot 755 and circular regions 785. As shown in FIG. 7K, a second Au-film 795 can then be deposited to provide the outer webbing. FIG. 7L shows a final PR lift-off to provide the completed sub-wavelength aperture structure 786 shown in the side view of FIG. 7L and the top view of FIG. 7M.

Figure 8A:
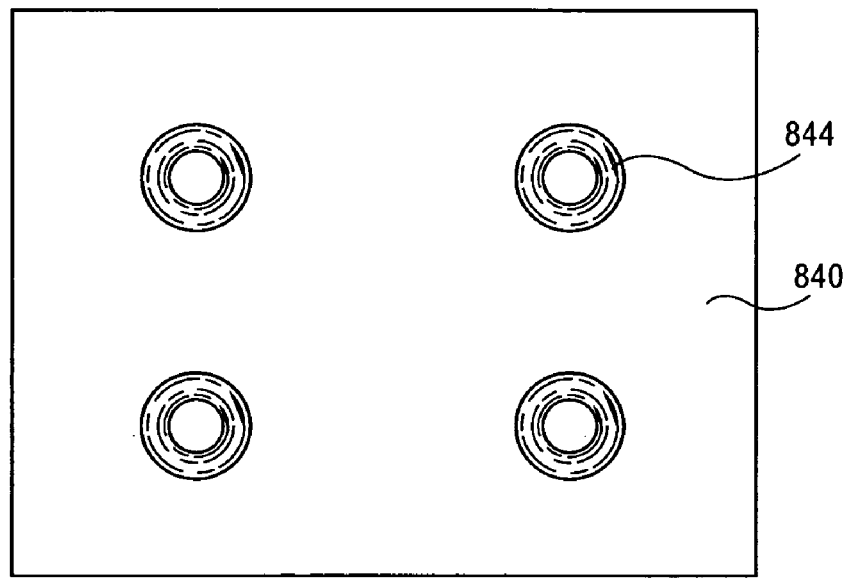
FIGS. 8A-8B depict a top view and a cross sectional view, respectively, of an exemplary plasmonic antenna array in accordance with the present teachings.
Figure 8B:
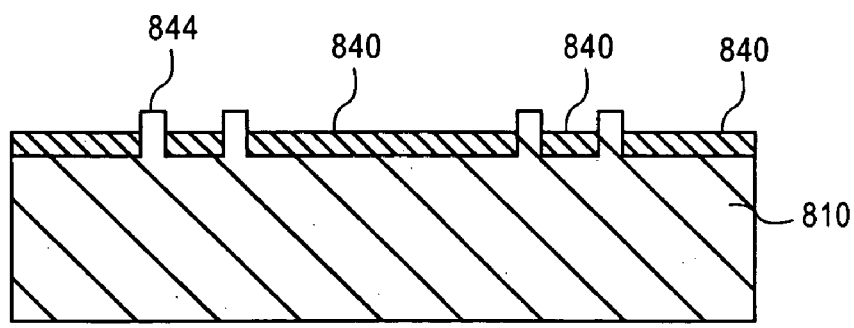

In various embodiments, strongly enhanced three-wave or four-wave mixing, such as, for example, second harmonic generation, can be achieved using a plasmonic antenna. Referring to FIG. 8A, a top view of a portion of a plasmonic antenna 800 is shown. Plasmonic antenna 800 can include a metal film 840 and filled aperture gaps 844. As shown the cross sectional view of FIG. 8B, aperture gaps 844 can be filled to form circular posts. The circular posts filling aperture gaps 844 can protrude from a substrate 810 through metal film 840. Metal film 840 can be formed of, for example, Au and substrate 810 can be formed of, for example, GaAs. According to various embodiments, plasmonic antenna 800 can further include a plurality of corrugations as disclosed herein. While not intending to be bound to any particular theory, it is believed that the plasmonic antenna provides strong electromagnetic field enhancements in the vicinity of the aperture gaps. Moreover, because no phase matching is required to realize significant optical frequency conversion, the disclosed approach can be generalized for use with most nonlinear materials.

Figure 9:
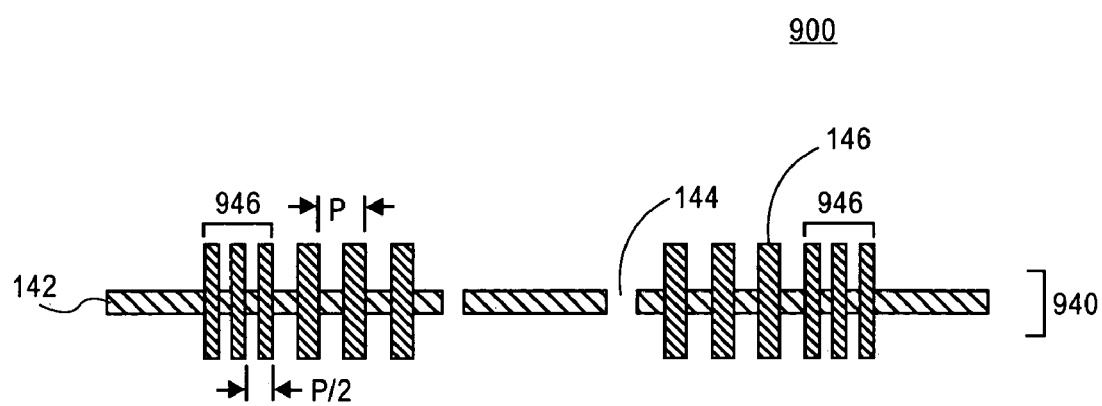
FIG. 9 depicts a cross sectional view of a plasmonic antenna including a Bragg grating to reflect the surface plasma wave in accordance with the present teachings.

As discussed above, the plasmonic antennas disclosed here can couple incident electromagnetic radiation to surface plasma waves. The surface plasma waves can travel inward towards the sub-wavelength aperture as well as outward away from the sub-wavelength aperture. In an exemplary embodiment, the outward traveling surface plasma waves can be reflected inward towards the sub-wavelength aperture by terminating the metal film. Referring back to FIG. 1A, rather than extending metal film 142 further outward, it can be terminated as shown to reflect the surface plasma waves inward towards the sub-wavelength aperture. In another exemplary embodiment, a Bragg reflector can be used to reflect the surface plasma waves inward. As shown in FIG. 9, a plasmonic antenna 900 can include a metal film 140, a sub-wavelength aperture 144, and a plurality of corrugations 146. Plasmonic antenna 900 can further include a Bragg reflector 946 to reflect the surface plasma waves inward towards sub-wavelength aperture 144. Bragg reflector 946 can have a pitch P/2, where P is the pitch of the corrugations.

Other embodiments of the invention will be apparent to those skilled in the art from consideration of the specification and practice of the invention disclosed herein. It is intended that the specification and examples be considered as exemplary only.

What is claimed is:

1. An infrared detector element comprising:
an infrared detector; and
a plasmonic antenna disposed within a near field of the infrared detector, wherein the plasmonic antenna comprises,
a metal film,
a sub-wavelength aperture in the metal film, and
a plurality of circular corrugations centered around the sub-wavelength aperture.

2. The infrared detector element of claim 1, wherein the sub-wavelength aperture comprises one of a coaxial structure, a portion of a coaxial structure, a complex geometric shape, and a hole.

3. The infrared detector element of claim 1, wherein the infrared detector is a sub-wavelength detector.

4. The infrared detector element of claim 1, wherein the infrared detector is one of a photon detector and a thermal detector.

5. The infrared element of claim 1, wherein the sub-wavelength aperture comprises a coaxial shape having an inner diameter and an outer diameter, and wherein a gap of the sub-wavelength aperture contains air.

6. The infrared detector of claim 1, wherein a gap of the sub-wavelength aperture comprises a dielectric material having an index of refraction n.

7. The infrared detector element of claim 1, further comprising a dielectric film disposed over the infrared detector,
wherein the infrared detector comprises a photon detector, and
wherein the plasmonic antenna is disposed on the dielectric film.

8. The infrared detector element of claim 1, wherein the plurality of circular corrugations centered around the sub-wavelength aperture are disposed on a top portion of the metal film.

9. The infrared detector element of claim 1, wherein the plurality of circular corrugations centered around the sub-wavelength aperture have a first pitch on a top portion of the metal film and a second pitch on a bottom portion of the metal film.

10. The infrared detector element of claim 1, wherein the plasmonic antenna further comprises a Bragg reflector disposed to reflect surface plasma waves towards the sub-wavelength aperture.

11. The infrared detector element of claim 1, wherein a period of the plurality of circular corrugations is about half a wavelength of incident infrared radiation.

12. An infrared detector array comprising a plurality of pixels, wherein each of the plurality of pixels comprises an infrared detector element as claimed in claim 1.

13. The infrared detector array of claim 12, wherein an area of each of the plurality of pixels is significantly larger than an area of the infrared detector.

14. A method of detecting electromagnetic radiation comprising:
providing a plasmonic antenna within a near field of a detector;
propagating surface plasma waves along a metal film portion of the plasmonic antenna;
coupling an energy from incident electromagnetic radiation to the surface plasma waves using a plurality of corrugations on the metal film; and
transmitting the energy through a sub-wavelength aperture in the metal film to the detector.

15. The method of claim 14, wherein a wavelength of the electromagnetic radiation ranges from about 400 nm to about 10 cm.

16. The method of claim 14, wherein a shape and a size of the sub-wavelength aperture is selected to transmit a desired wavelength peak.

17. The method of claim 14, further comprising filling a gap of the sub-wavelength aperture with a dielectric material to transmit a desired wavelength peak.

18. The method of claim 14, wherein the electromagnetic radiation comprises an infrared radiation, and wherein the detector comprises a sub-wavelength infrared detector.

19. The method of claim 14, wherein the energy transmitted through the sub-wavelength aperture comprises one or more of three-wave mixing and four-wave mixing.

20. The method of claim 14, further comprising reflecting surface plasma waves towards the sub-wavelength aperture using a Bragg reflector.

21. An electromagnetic radiation detector element comprising:
an electromagnetic radiation detector; and
a plasmonic antenna disposed within a near field of the electromagnetic radiation detector, wherein the plasmonic antenna comprises,
a metal film,
a sub-wavelength aperture in the metal film, and
a plurality of circular corrugations centered around the sub-wavelength aperture.

22. The electromagnetic radiation detector element of claim 21, wherein the sub-wavelength aperture comprises one of a coaxial structure, a portion of a coaxial structure, a complex geometric shape, and a hole.

23. The electromagnetic radiation detector element of claim 21, wherein a gap of the sub-wavelength aperture is filled with a material comprising GaAs.

24. An electromagnetic radiation detector array comprising a plurality of pixels, wherein each of the plurality of pixels comprises an electromagnetic radiation detector element as claimed in claim 21.

* * * * *

UNITED STATES PATENT AND TRADEMARK OFFICE
CERTIFICATE OF CORRECTION

PATENT NO. : 7,329,871 B2
APPLICATION NO. : 11/346229
DATED : February 12, 2008
INVENTOR(S) : Wenjun Fan et al.

It is certified that error appears in the above-identified patent and that said Letters Patent is hereby corrected as shown below:

The following should be inserted at Column 1, line 4:

This invention was developed with Government support under Contract No. MDA972-00-1-0024 from the Department of Defense/Defense Advanced Research Projects Agency. The U.S. Government has certain rights in the invention.

Signed and Sealed this

Seventh Day of December, 2010

David J. Kappos
*Director of the United States Patent and Trademark Office*